US006666592B1

(12) United States Patent
Wexler et al.

(10) Patent No.: US 6,666,592 B1
(45) Date of Patent: Dec. 23, 2003

(54) PHOTOGRAPHIC PROCESSING SYSTEM

(75) Inventors: Ronald M. Wexler, Rochester, NY (US); Donna M. Timmons, Rochester, NY (US); Jay E. Mathewson, North Chili, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/247,911

(22) Filed: Sep. 20, 2002

(51) Int. Cl.[7] .................................................. G03B 3/02
(52) U.S. Cl. ........................................ 396/578; 396/626
(58) Field of Search ................................ 396/567–570, 396/578, 626; 355/27–29, 77; 705/28, 30, 400

(56) References Cited

U.S. PATENT DOCUMENTS

| | | | |
|---|---|---|---|
| 5,194,348 A | 3/1993 | Morigaki et al. | 430/17 |
| 5,439,584 A | 8/1995 | Rosenfield | 210/136 |
| 5,477,301 A | 12/1995 | Earle et al. | 396/626 |
| 5,622,631 A | 4/1997 | Rosenfield | 210/668 |
| 5,758,223 A | 5/1998 | Kobayashi et al. | 396/627 |
| 5,784,661 A | 7/1998 | Evans et al. | 396/618 |
| 5,864,729 A | 1/1999 | Piccinino, Jr. et al. | 396/615 |
| 5,890,028 A | 3/1999 | Nomura et al. | 396/626 |
| 6,290,404 B1 | 9/2001 | Twist et al. | 396/579 |
| 6,383,727 B1 | 5/2002 | Twist et al. | 430/398 |
| 6,468,722 B1 * | 10/2002 | Call et al. | 430/461 |
| 6,490,569 B1 * | 12/2002 | Grune et al. | 705/400 |
| 6,520,693 B2 * | 2/2003 | Lobo et al. | 396/626 |

FOREIGN PATENT DOCUMENTS

| | | |
|---|---|---|
| EP | 0327274 | 11/1995 |
| EP | 0947429 | 6/1999 |

OTHER PUBLICATIONS

Hendrik A. Verfaillie, Monsanto Company, Robin Bidwell, Environmental Resources Management, "Measuring ECO–Efficiency,", Jun. 2000; pp. 1–36.

* cited by examiner

*Primary Examiner*—D Rutledge
(74) *Attorney, Agent, or Firm*—David A. Novais

(57) ABSTRACT

The present invention provides for a processing system and method of operating a photographic processor which comprises monitoring an average consumption of water, chemistry, packaging material and energy per unit amount of photographic film processed in the processor. By taking into account the inter-relationship between all of the above-noted parameters, a fully-automated color film processor having a specified eco-efficiency property can be designed. The eco-efficiency property of the processor is characterized in that it provides more function for the processor with less environmental impacts than comparable products and combines attributes such as minimization of mass and a volume of solution that is heated by a processor, effective use of energy, simplification of power consumption, minimization of time required to process film, recovery of waste produced during operation of the processor, and recovery and reuse of water evaporated during use of the processor.

18 Claims, 1 Drawing Sheet

PHOTOGRAPHIC PROCESSING SYSTEM

CROSS REFERENCE TO RELATED APPLICATIONS

Reference is made to commonly assigned copending patents U.S. Pat. No. 6,468,722 issued Oct. 22, 2000, entitled a PHOTOFINISHING PROCESSING SYSTEM AND A PROCESSING SOLUTION SUPPLY CARTRIDGE FOR THE PROCESSING SYSTEM and U.S. Pat. No. 6,520,693 issued Feb. 18, 2003, entitled a METHOD OF PROVIDING PHOTOPROCESSING SERVICES.

FIELD OF THE INVENTION

The present invention relates to a photographic processing system and method of operating a photographic processing system in accordance with specified eco-efficiency properties.

BACKGROUND OF THE INVENTION

Eco-efficiency, as defined by the World Business Council on Sustainable Development (WBCSD), *Measuring eco-efficiency: A guide to reporting company performance*, June 2000, relates to the concept of delivering more value from lower inputs of materials and energy and with reduced emissions. Therefore, eco-efficient products should be designed to provide more function to the user with less environmental impact than comparable products.

Growing customer awareness of environmental issues, particularly in Japan and Northern Europe, is creating incentives for companies to consider the environmental performance of products during design. While generally not the primary factor in purchasing decisions, environmental performance can differentiate products with similar features, cost and reliability. In addition, reductions in material and energy use can produce direct economic benefits to both manufacturers and customers.

Because eco-efficiency is an emerging issue, approaches to measure eco-efficiencies have varied widely. In response to the disparity of measurement approaches, the WBCSD established a standard eco-efficiency measurement framework in June 2000. This framework is most applicable to gauging the eco-efficiency of organizations. With respect to products, the WBCSD states that there are no indicators that can be applied broadly across product categories for the environmental influence of product use; rather, product specific indicators are necessary.

In designing photographic processors, the amount of material and/or energy consumed generally relates to the following parameters: the use and/or consumption of chemistry; the use and/or consumption of water; the use and/or consumption of packaging material; and the use and/or consumption of energy per roll or unit amount of photographic material or film processed. Known processors generally take into account a single one of the above parameters with respect to the efficient operation of the processor. This may not necessarily lead to a more eco-efficient processor since a processor which is designed to use less chemistry may have increased water consumption, increased packaging material use and increased energy use. Further, a processor which is designed to use less energy, may have an increased use of chemistry, water and packaging material.

As an example, U.S. Pat. No. 6,290,404 describes a processing system which provides for an efficient use of energy by using sources of heat such as electrical, electromechanical and mechanical components in a processor.

U.S. Pat. No. 6,383,727 provides for an efficient use of water within a photoprocessor by recovering water from humid air sources within the processing system and reusing the water in the processing system.

U.S. Pat. No. 5,784,661 provides for a high capacity low volume processor in which an outer tank and inner rack provide for a thin processing path. The arrangement of U.S. Pat. No. 5,784,661 provides for a low volume processor.

Pending U.S. application Ser. No. 09/823,076 discloses a method of providing photoprocessing services in which the packaging system for supplying solutions to a photofinishing site can be used during several usage cycles and refurbished until the integrity of the system begins to decrease. This provides an example of an efficient use of packaging material in a photoprocessor. A further method of providing photoprocessing services which includes supplying and removing processing liquids is described in Agfa, Research Disclosure No. 408110 to Verlinden et al.

As noted above, systems and methods described in the above patents and application are designed so as to account for a single parameter of the various parameters noted above that are relevant for an eco-efficient processor. More specifically, there are no known systems which take into account the interrelationship of all of the above parameters for operating a film processing system, and more specifically, the interrelationship between chemistry consumption, water consumption, packaging material consumption and energy consumption. It is noted that the nature of the relationships between the above parameters is complex and may vary on a case by case basis due to the staggering number of factors that contribute to an overall system design. An improvement in any one category may have a deleterious impact on others.

SUMMARY OF THE INVENTION

The present invention provides for a fully-automated photographic processor and a method of processing photographic material in accordance with a specified eco-efficiency property that takes into account the use and/or consumption of chemistry, the use and/or consumption of water, the use and/or consumption of packaging materials and the use and/or consumption of energy per roll or unit amount of photographic material processed in the photographic processor, and therefore takes into account the inter-relationship between each of the above-noted parameters.

The method and photographic processor of the present invention builds upon the eco-efficiency framework established by the WBCSD by defining a film processor eco-efficiency index (FPEI) that can be applied specifically to the product category of fully-automated color film processors. The FPEI enables consideration and improvement of eco-efficiency during film processor conception and design.

The photographic processor of the present invention comprises one or more of the following attributes (a) minimization of the mass and/or volume of photochemical solution or chemistry that is heated by the processor; (b) intelligent energy management of the electrical components of the processor; (c) simplification of the processor design to minimize power consumption; (d) minimization of the time required to process the film; (e) recovery of waste heat produced during operation of the processor, and (f) recovery and re-use of water evaporated during operation of the processor. Inclusion of these attributes results in a desired FPEI which defines an eco-efficient photographic processor.

The present invention therefore provides for a processing system for processing photographic material which comprises a photographic processor; and a solution supply system adapted to supply at least one of a chemical processing solution or water to the photographic processor to process photographic film.

In the system of the present invention, an eco-efficiency index based on an average consumption of water, chemistry, packaging material and energy per unit amount of photographic film processed in the photographic processor is based on the following equation number (1):

$$FPEI=\{(WTref/WTact)+(CHref/CHact)+(PKref/PKact)+(ENref/ENact)\}/4. \quad (1)$$

The terms in the above-noted equation (1) are defined as follows:

FPEI=an eco-efficiency index for the photographic processor;

WTref=a reference amount of water needed to develop a unit amount of film;

WTact=an actual amount of water consumed per unit amount of film developed in the photographic processor;

CHref=a reference amount of chemistry needed to develop the unit amount of film;

CHact=an actual amount of chemistry consumed per unit amount of film developed in the photographic processor;

PKref=a reference amount of packaging material needed to develop the unit amount of film;

PKact=an actual amount of packaging material consumed per unit amount of film developed in the photographic processor;

ENref=a reference amount of energy needed to develop the unit mount of film; and ENact=an actual amount of energy consumed per unit amount of film developed in the photographic processor.

The present invention also relates to a method of operating a photographic processing system which comprises the step of monitoring an eco-efficiency index based on an average consumption of water, chemistry, packaging material and energy per unit amount of photographic film processed in a photographic processor of the processing system based on equation (1) noted above.

Within the context of the present invention, a unit amount of film developed preferably refers to a roll of film. However, the present invention is not limited thereto, and it is noted that a unit amount could refer to multiple rolls of film spliced together to form a batch.

DETAILED DESCRIPTION OF THE INVENTION

Figure 1:
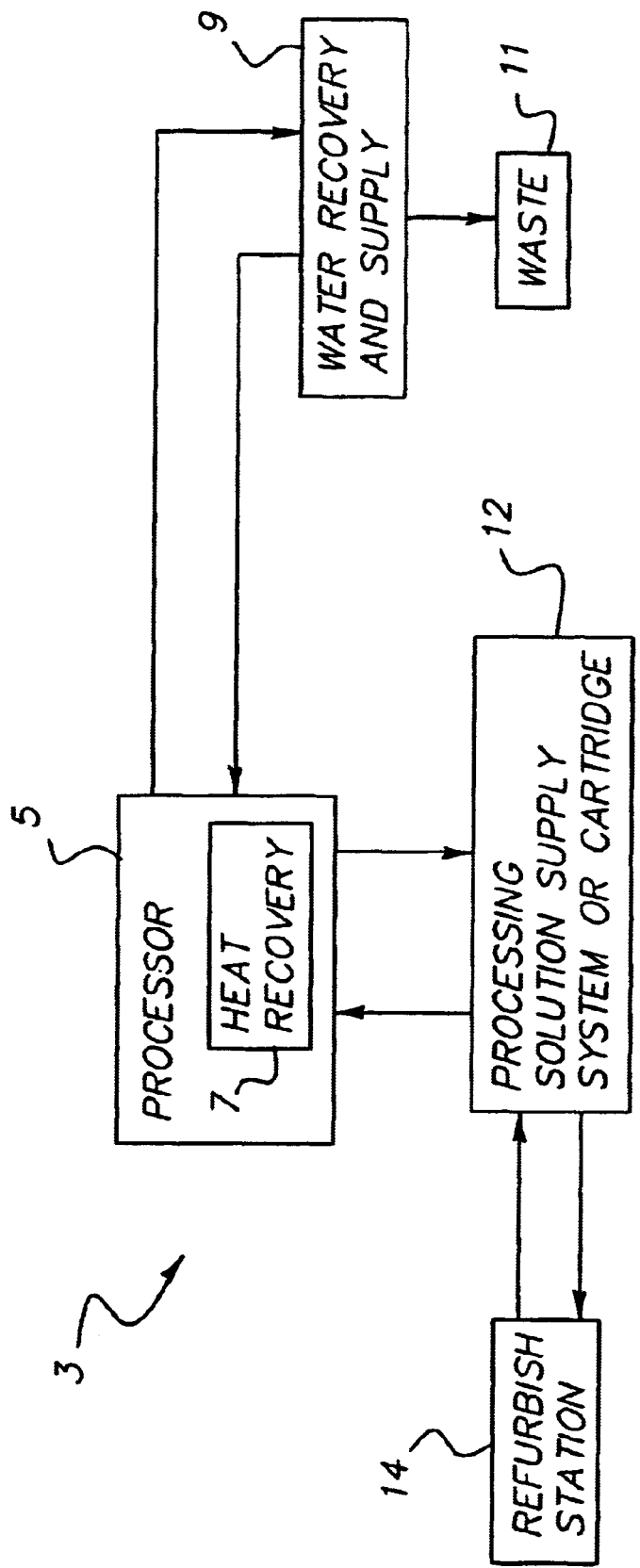
FIG. 1 is a schematic view of a processing system in accordance with the present invention.

Referring now to FIG. 1 which schematically illustrates a processing system 3 in accordance with the present invention, processing system 3 includes a photographic processor 5. Photographic processor 5 is preferably a self contained processor which includes no external plumbing for supplied processing chemical solutions. Self-contained processor 5 could include internal or external plumbing for waste solution.

Processor 5 can be any one of a number of types of processors. Non-limiting examples of processors that could be used in the present invention include processors such as is disclosed in U.S. Pat. No. 6,383,727; U.S. Pat. No. 5,784,661; U.S. Pat. No. 5,864,729; U.S. Pat. No. 5,890,028, copending U.S. application Ser. No. 09/920,495, or co-pending GB Application No. 0122457.5. In addition to these processors and their methods for applying processing solutions to film, methods such as inkjet or spray bar application of processing solutions, for example, as is disclosed in U.S. Pat. No. 5,477,301 or U.S. Pat. No. 5,758,223, may be employed in the present invention. Processor 5 is adapted to be fluidly connected with a processing solution supply system or cartridge 12 which supplies known processing solutions for processing photographic film or material in processor 5. Processing solution supply system or cartridge 12 is adapted to hold and supply developer solution, bleach solution, fix solution and a final rinse or cleaning solution to processor 5. Optionally, processing solution supply system 12 could include a waste cartridge for collecting waste solution after having gone through a processing cycle in processor 5, and further, the waste cartridge could include a device for treating the waste solution. A processing solution supply system or cartridge 12 which can be utilized in the present invention is described in co-pending U.S. application Ser. No. 09/823,076 or in Research Disclosure No. 408110.

As a still further option, and in order to conserve packaging material used by processing system 5, processing solution system or cartridge 12 could be adapted to be refurbished at a refurbishing station 14, for re-use in processor 5. The features of the refurbishment basically involves at least cleaning out the processing solution containers and replacing those containers where damage or wear causes the container to no longer be used. A refurbishing system in accordance with the features of the present invention is described in Research Disclosure No. 408110 or co-pending application Ser. No. 09/823,076. A refurbishing system as described in this co-pending application involves a method of distributing photoprocessing solution from a source of manufacture to a photofinishing site which utilizes a packaging system that can be re-used several times, until damage or wear causes its physical integrity to render it unusable. The repeated re-use of the robust container reduces the amount of packaging materials consumed per unit area of imaging materials processed.

As a still further feature of processing system 3 of the present invention, processor 5 could include a heat recovery system 7 as described in U.S. Pat. No. 6,290,404. This provides for an efficient use of energy for processing system 3 by capturing and using heat generated by the mechanical, electrical or electro-mechanical components of the processor to process photographic material.

Also, a water recovery and supply system 9 provides for efficient re-use of water within the system of processing 5. More specifically, an efficient water recovery system includes water recovery from humid air sources for reuse in the processing system as described in U.S. Pat. No. 6,383, 727. Wash water recovery and supply system 9 could be separate or integrated with processor 5.

As described above, the interaction of the consumption of chemistry, water, packaging material and energy contribute to the total efficiency of a photographic processor. However, the nature of the relationship between the different parameters makes it difficult to design an efficient processor which takes into account all of these parameters since an improvement in one category may have an adverse effect on another.

Applicants note that a processor which exhibits preferred eco-efficiency characteristics is a Konica QP-32 film processor (originally offered for use with the Konica QD-21 Minilab system) and this processor is used as a reference processor in the present invention. More specifically, the values representing the consumption of chemistry, water, packaging material and energy per unit amount of film processed in the Konica QP-32 film processor are used as reference values.

In the Konica QP-32 film processor, it has been determined that for a unit amount or roll of film processed, the processor consumes 0.0085 kg of chemistry per roll; 0.071 liter of water per roll; 0.0057 kg of packaging material per roll; and 0.77 MJ of energy per roll. With respect to the present invention, these values will be considered reference values for determining an FPEI for a processor. Therefore, the FPEI for the Konica QP-32 is 1.0.

Eco-efficiency is generally expressed as a ratio of product or service value divided by environmental influence. In the present invention, the product value of a fully automated color film processor is defined as the number of rolls or unit amount of film developed. As noted upon, four environmental influences or parameters have been defined: water consumption; chemistry consumption; packaging consumption; and energy consumption. All of these influences or parameters have been cited by the WBCSD as relevant to product eco-efficiency. In order to avoid a mathematical error in the ratio when one or more environmental influences is reduced to a value of zero, the conventional eco-efficiency ratio noted above has been inverted with respect to the present invention, and is expressed as follows:

Environmental influence÷product or service value.

The FPEI is preferably composed of four elements: liters of water consumed per roll or unit amount of film developed (WT); kilograms of chemistry consumed per unit amount or roll of film developed (CH); kilograms of packaging material consumed per unit amount or roll of film developed (PK); and Megajoules of electrical power consumed per roll or unit amount of film developed (EN). The FPEI is calculated by the following formula (equation (1)):

$$FPEI=\{(WTref/WTact)+(CHref/CHact)+(PKref/PKact)+(ENref/ENact)\}/4 \quad (1)$$

wherein:

FPEI=an eco-efficiency index for the photographic processor;

WTref=a reference amount of water needed to develop a unit amount of film;

WTact=an actual amount of water consumed per unit amount of film developed in the photographic processor;

CHref=a reference amount of chemistry needed to develop the unit amount of film;

CHact=an actual amount of chemistry consumed per unit amount of film developed in the photographic processor;

PKref=a reference amount of packaging material needed to develop the unit amount of film;

PKact=an actual amount of packaging material consumed per unit amount of film developed in the photographic processor;

ENref=a reference amount of energy needed to develop the unit amount of film; and ENact=an actual amount of energy consumed per unit amount of film developed in said photographic processor.

As indicated above, a unit amount can refer to a single roll of film or multiple rolls spliced together to form a batch.

WT is calculated by adding the amount of water contained in all photochemical supply solutions (Wss) to the water replenished during the processor operation (WR). Both volumes are expressed in liters per standard roll or unit of film. A standard roll or unit includes 24 exposures of 35 mm film.

$$WT=(Wss+WR)$$

CH is calculated by adding the mass (less water) of the chemical ingredients contained in all photochemical supply solutions consumed in order to process a standard roll of film.

PK is calculated by adding the mass of all the packaging materials that are consumed in association with processing a standard roll of film. Packaging materials include, but are not limited to, items associated with the supply of water or photochemistry such as bottles, closures, boxes, dividers, wrappers and cases, and specifically, the items with respect to the photofinishing solution chemical supply cartridge or system 12.

EN is calculated by assuming that a typical film processor has four modes of power consumption during operation: sleep mode, warm-up mode, idle mode, and processing mode. In sleep mode, the processing solutions are not heated, but some type of timing device may be active to enable the processor to begin heating solutions at a predetermined time. In practice, a processor may operate in sleep mode for twelve hours per day. Warm-up mode is a transient condition in which the processor components are heated to a desired temperature state. No processing occurs during warm-up mode. The time period for warm-up ($T_{warm-up}$) is dependent upon the processor design. In processing mode, film is actively being processed; solutions are held at a defined temperature, and drive motors and dryers are operating. In practice, a processor may operate in this mode each day for the amount of time required to process 25 standard rolls of film ($T_{processing}$), end to end. $T_{processing}$ is dependent on processor design. Idle mode is the state in which the processor can begin processing film immediately, but is not actively processing. Typically, a processor operates in idle mode for the balance of the day ($T_{idle}$ (hrs)=24−12−$T_{warm-up}$−$T_{processing}$ (hrs)).

Power consumption in sleep, idle, warm-up and processing modes can be measured with a standard wattmeter. These values are denoted as Watts$_{sleep}$, Watts$_{idle}$, Watts$_{warm-up}$ and Watts$_{processing}$. Accordingly, the following formula (2) is used to calculate EN:

$$EN(MJ/\text{roll})=\{0.0036MJ/\text{watt-hr}*[(\text{Watts}_{sleep}*12)+\text{Watts}_{processing}*T_{processing}+\text{Watts}_{warm-up}*T_{warm-up}+\text{Watts}_{idle}*T_{idle}]\}\div 25. \quad (2)$$

Improvements in eco-efficiency are realized in a fully-automated color film processor by combining the attributes or parameters noted above. More specifically, improvements in eco-efficiency can be achieved by minimizing the mass and/or the volume of photochemical solution that is heated by the processor, managing the intelligent energy of the electrical components of the processor, simplifying the processor design to minimize power consumption, minimizing the time required to process the film, recovering waste heat produced during operation of the processor, recovering and re-using water evaporated during operation of the processor, minimizing the mass of packaging material, re-using packaging materials, and applying integrated silver recovery technology for simplified waste handling. Inclusion of these attributes and using the reference values for the Konica QP-32 processor, equation (1) results in a FPEI of greater than 1.0, preferably greater than or equal to 1.05, and most preferably greater than or equal to 1.1.

In designing an eco-efficient processor in accordance with the present invention, processing system 3 includes photographic processor 5 as shown in FIG. 1, as well as a solution supply system 12. Processor 5 is preferably designed as a self-contained processor that has no external plumbing for supplying or discharging the chemical processing solutions to or from the processor, while the solution supply system is basically designed as a cartridge that is adapted to be fluidly connected to the processor. Solution supply system 12 is adapted to supply chemical processing solution or water to photographic processor 5 to process photographic film. In the design of photographic processor 5, an average consumption of water, chemistry, packaging material and energy per unit amount of photographic film processed in the processor is based on equation (1) noted above. That is, in determining the FPEI for a particular processor, first, it is needed to determine the value that you will use for the reference amount of water needed to develop a unit amount of film. For this purpose, the Konica QP-32 film processor is utilized and it is known that this processor uses 0.071 liters of water per roll. This value is divided by the actual amount of water consumed per unit amount of film developed in processor 5. Additionally, a reference amount of chemistry needed to develop the unit amount of film is determined. Again, the Konica QP-32 film processor can be used as a reference value and it is known that this processor uses 0.0085 kg of chemistry per roll. The reference value of chemistry is thereby divided by the actual amount of chemistry consumed per unit amount of film developed in processor 5.

Additionally, a reference amount of packaging material needed to develop the unit amount of film is determined. Again, using the Konica QP-32 film processor as a reference value, it is known that this processor uses 0.0057 kilograms of packaging material per roll. This value is divided by the actual amount of packaging material consumed per unit amount of film developed in processor 5. Finally, a reference amount of energy needed to develop the unit amount of film is determined. Using the Konica QP-32 film processor as a reference value, it is noted that this processor uses 0.77 MJ of energy per roll of film. This value is divided by the actual amount of energy consumed per unit amount of film developed in photographic processor 5. All of the above is in accordance with equation (1).

The sum of the above noted values is thereafter divided by four to provide for the FPEI, also in accordance with equation (1).

Knowing the parameters necessary to provide for a preferred FPEI, processor 5 of the present invention can be designed so as to provide for an index score that is greater than 1.0, which is an FPEI for a processor (Konica QP-32 film processor) that is considered to have acceptable eco-efficient properties. Therefore, processor 5 can be designed to take into account the interrelationship with respect to the amount of water, the amount of chemistry, the amount of packaging material and the amount of energy used and/or consumed by the photographic processor per unit amount or roll of film, to provide for an efficiency index for the photographic processor which is greater than 1.0. As noted above, a desired FPEI should be greater than 1.0, preferably greater than or equal to 1.05 and most preferably greater than or equal to 1.1. By using the FPEI equation noted above, it is possible to adjust the parameters noted above with respect to equation (1) to design a processor which takes into account all of the above parameters.

The invention has been described in detail with particular reference to certain preferred embodiments thereof, but it will be understood that variations and modifications can be effected within the spirit and scope of the invention.

What is claimed is:

1. A processing system for processing photographic material, the processing system comprising:

a photographic processor; and a solution supply system adapted to supply at least one of a chemical processing solution or water to said photographic processor to process photographic film, wherein an eco-efficiency index based on an average consumption of water, chemistry, packaging material and energy per unit amount of photographic film processed in said photographic processor is based on the following equation:

$$FPEI=\{(WTref/WTact)+(CHref/CHact)+(PKref/PKact)+(ENref/ENact)\}/4;$$

wherein:
FPEI=an eco-efficiency index for said photographic processor;
WTref=reference amount of water needed to develop a unit amount of film;
WTact=actual amount of water consumed per unit amount of film developed in said photographic processor;
CHref=reference amount of chemistry needed to develop said unit amount of film;
CHact=actual amount of chemistry consumed per unit amount of film developed in said photographic processor;
PKref=reference amount of packaging material needed to develop said unit amount of film;
PKact=actual amount of packaging material consumed per unit amount of film developed in said photographic processor;
ENref=reference amount of energy needed to develop said unit amount of film;
ENact=actual amount of energy consumed per unit amount of film developed in said photographic processor; and
FPEI>1.0.

2. A processing system according to claim 1, wherein said photographic processor is a self-contained processor having no external plumbing for supplying or discharging said chemical processing solutions to or from said photographic processor.

3. A processing system according to claim 1, wherein said solution supply system is a cartridge adapted to be fluidly connected to the photographic processor.

4. A method of operating a photographic processing system, the method comprising the step of:

monitoring an eco-efficiency index based on an average consumption of water, chemistry, packaging material and energy per unit amount of photographic film processed in a photographic processor of said processing system based on the following equation:

$$FPEI=\{(WTref/WTact)+(CHref/CHact)+(PKref/PKact)+(ENref/ENact)\}/4;$$

wherein:
FPEI=an eco-efficiency index for said photographic processor;
WTref=reference amount of water needed to develop a unit amount of film;
WTact=actual amount of water consumed per unit amount of film developed in said photographic processor;
CHref=reference amount of chemistry needed to develop said unit amount of film;
CHact=actual amount of chemistry consumed per unit amount of film developed in said photographic processor;
PKref=refererence amount of packaging material needed to develop said unit amount of film;
PKact=actual amount of packaging material consumed per unit amount of film developed in said photographic processor;
ENref=reference amount of energy needed to develop said unit amont of film;
ENact=actual amount of energy consumed per unit amount of film developed in said photographic processor; and
FPEI>1.

5. A method according to claim 4, wherein said photographic processor is a self-contained processor having no external plumbing for supplying or discharging said chemical processing solution to or from said photographic processor.

6. A method according to claim 4, wherein said processing system further comprises a cartridge type solution supply system which is adapted to be fluidly connected to the photographic processor.

7. A processing system for processing photographic material, the processing system comprising:
a photographic processor; and
a solution supply system adapted to supply at least one of a chemical processing solution or water to said photographic processor to process photographic film, wherein an eco-efficiency index based on an average consumption of water, chemistry, packaging material and energy per unit amount of photographic film processed in said photographic processor is based on the following equation:

$$FPEI=\{(WTref/WTact)+(CHref/CHact)+(PKref/PKact)+(ENref/ENact)\}/4;$$

wherein:
FPEI=an eco-efficiency index for said photographic processor;
WTref=reference amount of water needed to develop a unit amount of film;
WTact=actual amount of water consumed per unit amount of film developed in said photographic processor;
CHref=reference amount of chemistry needed to develop said unit amount of film;
CHact=actual amount of chemistry consumed per unit amount of film developed in said photographic processor;
PKref=reference amount of packaging material needed to develop said unit amount of film;
PKact=actual amount of packaging material consumed per unit amount of film developed in said photographic processor;
ENref=reference amount of energy needed to develop said unit amount of film;
ENact=actual amount of energy consumed per unit amount of film developed in said photographic processor; and
FPEI≧1.05.

8. A processing system according to claim 7, wherein said photographic processor is a self-contained processor having no external plumbing for supplying or discharging said chemical processing solutions to or from said photographic processor.

9. A processing system according to claim 7, wherein said solution supply system is a cartridge adapted to be fluidly connected to the photographic processor.

10. A method of operating a photographic processing system, the method comprising the step of:
monitoring an eco-efficiency index based on an average consumption of water, chemistry, packaging material and energy per unit amount of photographic film processed in a photographic processor of said processing system based on the following equation:

$$FPEI=\{(WTref/WTact)+(CHref/CHact)+(PKref/PKact)+(ENref/ENact)\}/4;$$

wherein:
FPEI=an eco-efficiency index for said photographic processor;
WTref=reference amount of water needed to develop a unit amount of film;
WTact=actual amount of water consumed per unit amount of film developed in said photographic processor;
CHref=reference amount of chemistry needed to develop said unit amount of film;
CHact=actual amount of chemistry consumed per unit amount of film developed in said photographic processor;
PKref=refererence amount of packaging material needed to develop said unit amount of film;
PKact=actual amount of packaging material consumed per unit amount of film developed in said photographic processor;
ENref=reference amount of energy needed to develop said unit amont of film;
ENact=actual amount of energy consumed per unit amount of film developed in said photographic processor; and
FPEI≧1.05.

11. A method according to claim 10, wherein said photographic processor is a self-contained processor having no external plumbing for supplying or discharging said chemical processing solution to or from said photographic processor.

12. A method according to claim 10, wherein said processing system further comprises a cartridge type solution supply system which is adapted to be fluidly connected to the photographic processor.

13. A processing system for processing photographic material, the processing system comprising:
a photographic processor; and
a solution supply system adapted to supply at least one of a chemical processing solution or water to said photographic processor to process photographic film, wherein an eco-efficiency index based on an average consumption of water, chemistry, packaging material and energy per unit amount of photographic film processed in said photographic processor is based on the following equation:

$$FPEI=\{(WTref/WTact)+(CHref/CHact)+(PKref/PKact)+(ENref/ENact)\}/4;$$

wherein:
    FPEI=an eco-efficiency index for said photographic processor;
    WTref=reference amount of water needed to develop a unit amount of film;
    WTact=actual amount of water consumed per unit amount of film developed in said photographic processor;
    CHref=reference amount of chemistry needed to develop said unit amount of film;
    CHact=actual amount of chemistry consumed per unit amount of film developed in said photographic processor;
    PKref=reference amount of packaging material needed to develop said unit amount of film;
    PKact=actual amount of packaging material consumed per unit amount of film developed in said photographic processor;
    ENref=reference amount of energy needed to develop said unit amount of film;
    ENact=actual amount of energy consumed per unit amount of film developed in said photographic processor; and
    $FPEI \geq 1.1$.

14. A processing system according to claim 13, wherein said photographic processor is a self-contained processor having no external plumbing for supplying or discharging said chemical processing solutions to or from said photographic processor.

15. A processing system according to claim 13, wherein said solution supply system is a cartridge adapted to be fluidly connected to the photographic processor.

16. A method of operating a photographic processing system, the method comprising the step of:
    monitoring an eco-efficiency index based on an average consumption of water, chemistry, packaging material and energy per unit amount of photographic film processed in a photographic processor of said processing system based on the following equation:

$$FPEI=\{(WTref/WTact)+(CHref/CHact)+(PKref/PKact)+(ENref/ENact)\}/4;$$

wherein:
    FPEI=an eco-efficiency index for said photographic processor;
    WTref=reference amount of water needed to develop a unit amount of film;
    WTact=actual amount of water consumed per unit amount of film developed in said photographic processor;
    CHref=reference amount of chemistry needed to develop said unit amount of film;
    CHact=actual amount of chemistry consumed per unit amount of film developed in said photographic processor;
    PKref=refererence amount of packaging material needed to develop said unit amount of film;
    PKact=actual amount of packaging material consumed per unit amount of film developed in said photographic processor;
    ENref=reference amount of energy needed to develop said unit amont of film;
    ENact=actual amount of energy consumed per unit amount of film developed in said photographic processor; and
    $FPEI \geq 1.1$.

17. A method according to claim 16, wherein said photographic processor is a self-contained processor having no external plumbing for supplying or discharging said chemical processing solution to or from said photographic processor.

18. A method according to claim 16, wherein said processing system further comprises a cartridge type solution supply system which is adapted to be fluidly connected to the photographic processor.

* * * * *